United States Patent
Lukka et al.

(10) Patent No.: US 11,682,097 B2
(45) Date of Patent: Jun. 20, 2023

(54) METHOD AND AN APPARATUS FOR SEPARATING AT LEAST ONE OBJECT FROM A PLURALITY OF OBJECTS

(71) Applicant: MP ZenRobotics Oy, Vantaa (FI)

(72) Inventors: Tuomas Lukka, Helsinki (FI); Janne Kujala, Hyvinkää (FI)

(73) Assignee: MP ZenRobotics Oy, Vantaa (FI)

( * ) Notice: Subject to any disclaimer, the term of this patent is extended or adjusted under 35 U.S.C. 154(b) by 226 days.

(21) Appl. No.: 17/086,671

(22) Filed: Nov. 2, 2020

(65) Prior Publication Data

US 2021/0110504 A1 Apr. 15, 2021

Related U.S. Application Data

(63) Continuation of application No. 15/668,224, filed on Aug. 3, 2017, now Pat. No. 10,839,474.

(30) Foreign Application Priority Data

Aug. 4, 2016 (FI) ...................................... 20165603

(51) Int. Cl.
*G06T 1/00* (2006.01)
*B25J 9/00* (2006.01)
(Continued)

(52) U.S. Cl.
CPC .......... *G06T 1/0014* (2013.01); *B07C 5/3422* (2013.01); *B25J 9/0093* (2013.01);
(Continued)

(58) Field of Classification Search
CPC ....... G06T 1/0014; B07C 5/3422; B07C 5/36; B25J 9/0093; B25J 9/026; B25J 9/163;
(Continued)

(56) References Cited

U.S. PATENT DOCUMENTS

| 5,100,005 A | * | 3/1992 | Noble | B65F 1/0006 209/699 |
| 5,641,072 A | * | 6/1997 | Otake | B65G 47/38 209/580 |

(Continued)

FOREIGN PATENT DOCUMENTS

| EP | 2 23 3 400 A2 | 9/2010 |
| WO | WO 91/11885 A1 | 8/1991 |
| WO | WO 2011/161304 A1 | 12/2011 |

OTHER PUBLICATIONS

Finnish Search Report for corresponding Finnish Patent Application No. 20165603 dated Nov. 18, 2016, 1 page
(Continued)

*Primary Examiner* — Thomas Randazzo
(74) *Attorney, Agent, or Firm* — Knobbe, Martens, Olson & Bear, LLP

(57) ABSTRACT

Feedback information is an important aspect in all machine learning systems. In robot systems that are picking objects from a plurality of objects this has been arranged by acquiring images of objects that have been picked. When images are acquired after picking they can be imaged accurately and the information about picking and also dropping success can be improved by using acquired images as a feedback in the machine learning arrangement being used for controlling the picking and dropping of objects.

20 Claims, 4 Drawing Sheets

(51) Int. Cl.
*B25J 9/02* (2006.01)
*B25J 9/16* (2006.01)
*G06F 16/432* (2019.01)
*G05B 19/425* (2006.01)
*G06K 7/14* (2006.01)
*B07C 5/342* (2006.01)
*B25J 19/02* (2006.01)
*G06N 20/00* (2019.01)

(52) U.S. Cl.
CPC .............. *B25J 9/026* (2013.01); *B25J 9/163* (2013.01); *B25J 19/023* (2013.01); *G05B 19/425* (2013.01); *G06F 16/434* (2019.01); *G06K 7/1404* (2013.01); *G06K 7/1447* (2013.01); *B25J 9/1697* (2013.01); *G05B 2219/39106* (2013.01); *G06N 20/00* (2019.01)

(58) Field of Classification Search
CPC . B25J 19/023; B25J 9/1697; B25J 9/16; B25J 13/08; G05B 19/425; G05B 2219/39106; G06F 16/434; G06K 7/1404; G06K 7/1447; G06N 20/00
See application file for complete search history.

(56) References Cited

U.S. PATENT DOCUMENTS

| | | | | |
|---|---|---|---|---|
| 6,008,636 | A * | 12/1999 | Miller | G01R 31/01 324/757.01 |
| 8,474,598 | B2 * | 7/2013 | Huber | B65G 47/084 198/429 |
| 8,577,500 | B2 | 11/2013 | Yamaguchi et al. | |
| 9,082,071 | B2 | 7/2015 | Skaff | |
| 9,227,323 | B1 * | 1/2016 | Konolige | H04N 5/33 |
| 9,486,926 | B2 * | 11/2016 | Kawano | B25J 15/06 |
| 9,639,535 | B1 * | 5/2017 | Ripley | G06F 16/583 |
| 10,059,005 | B2 * | 8/2018 | Huang | G05B 19/423 |
| 10,322,506 | B2 * | 6/2019 | Ding | B25J 9/1664 |
| 2013/0343640 | A1 * | 12/2013 | Buehler | G05B 19/42 382/155 |
| 2015/0019391 | A1 * | 1/2015 | Kumar | G06Q 10/087 705/28 |
| 2015/0081090 | A1 * | 3/2015 | Dong | B65G 43/08 700/230 |
| 2017/0080566 | A1 * | 3/2017 | Stubbs | G05B 19/418 |
| 2017/0121113 | A1 * | 5/2017 | Wagner | G06K 7/1443 |
| 2017/0126972 | A1 * | 5/2017 | Evans, V | H04N 23/45 |
| 2017/0174440 | A1 * | 6/2017 | Ripley | B07C 5/3412 |
| 2017/0225199 | A1 * | 8/2017 | Koistinen | B65F 1/1484 |
| 2017/0270631 | A1 * | 9/2017 | Melikian | B25J 9/1687 |
| 2017/0355078 | A1 * | 12/2017 | Ur | B25J 9/1612 |
| 2017/0369244 | A1 * | 12/2017 | Battles | B65G 27/04 |

OTHER PUBLICATIONS

Canadian Office Action for corresponding Canadian Patent Application No. 2,974,869 dated Sep. 29, 2017, 6 pages.
Extended European Search Report for European Patent Application No. 17836465.9 dated Dec. 10, 2019, 11 pages.
Communication pursuant to Article 94(3) EPC for European Patent Application No. 17836465.9 dated Oct. 14, 2020, 9 pages.
Almaddah, A. et al., "Visual and Physical Segmentation of Novel Objects", IEEE/RJS International Conference on Intelligent Robots and Systems, 807-812 (Sep. 2011).
Chang, L. et al., "Interactive singulation of objects from a pile", IEEE International Conference on Robotics and Automation, 3875-3882 (May 2012).
Guttormsen, E. et al., "A Machine Vision System for Robust Sorting of Herring Fractions", Food and Bioprocess Technology, 9(11): 1893-1900 (Jul. 2016).
Kujala, J. et al., "Picking a Conveyor Clean by an Autonomously Learning Robot", retrieved from the Internet: http://arxiv.org/pdf/1511.07608v1.pdf, 6 pages (Nov. 2015).
Levine, S. et al., "Learning Hand-Eye Coordination for Robotic Grasping With Deep Learning and Large-Scale Data Collection", www.arxiv.org, reference arXiv:1603.02199, 12 pages (2016)
Lukka, T. et al. "ZenRobotics Recycler—Robotic Sorting using Machine Learing", retrieved from Internet: https://users.ics.aalto.fi/praiko/oapers/SB14.pdf, 8 pages (Mar. 2014).
Monouchehri, H. et al., "Sorting: Possibilities, Limitations and Future", Conference in Minerals Engineering, 1-17 (Feb. 2003).
Scavino, E. et al., "Application of automated image analysis to the identification and extraction of recyclable plastic bottles", Journal of Zhejiang University Science A., 10(6): 794-799 (Jun. 2009).
Selver, A. et al., "An automated industrial conveyor belt system using image processing and hierarchical clustering for classifying marble slabs", Robotics and Computer Integrated Manufacturing, 27(1): 164-176 (Feb. 2011).

* cited by examiner

METHOD AND AN APPARATUS FOR SEPARATING AT LEAST ONE OBJECT FROM A PLURALITY OF OBJECTS

This application is a continuation of U.S. patent application Ser. No. 15/668,224, filed 3 Aug. 2017, which claims benefit of Serial No. 20165603, filed 4 Aug. 2016 in Finland and which applications are incorporated herein by reference. To the extent appropriate, a claim of priority is made to the above disclosed applications.

ACKNOWLEDGEMENT

The project leading to this application has received funding from the European Union's Horizon 2020 research and innovation programme under grant agreement No 673690.

DESCRIPTION OF BACKGROUND

The present disclosure relates to robot systems and particularly systems wherein the robot system needs to pick objects from a plurality of objects.

Robot systems have widely been used in many industries to perform repetitive tasks that require little capability to actually model visually or cognitively physical objects being manipulated or that require little skill to take a hold on and to move. Robots can also be built to work in environments hostile to human floor workers or to be able to work with material hazardous to humans such as toxic or radioactive materials, waste or massive objects. It is desirable to make such robot systems as autonomous as possible to minimize the amount of human involvement needed.

Patent publication WO2011/161304 addresses the problem of selection of physical objects in a robot system. The solution disclosed by WO2011/161304 relates to a method in which an apparatus receives first sensor data from first sensors and determines a target position from the data, the target position may be a position in space or an orientation of a gripper in a robot arm First instructions are issued to the robot arm or the gripper in order to move a gripper to the target position. Force feedback sensor data is received from force feedback sensors associated with either the robot arm or the gripper or from the first sensors. A failure in carrying out the first instructions is determined. Second sensor data is received from the at least one first sensor. Successful gripping of an object is determined from the second sensor data. Verification sensor data is received from at least one second sensor, in response to the determining of the successful gripping, second instructions are issued to the robot arm in order to move the arm to a predetermined position to release the grip of the gripper.

In the solution described above a problem is that the force feedback sensor provides limited information to be used as a feedback.

In an article by Sergey Levine, Peter Pastor, Alex Krizhevsky and Deirdre Quille with title "Learning Hand-Eye Coordination for Robotic Grasping with Deep Learning and Large-Scale Data Collection" a robotic learning system is disclosed. The article is available, for example, in www.arxiv.org with the reference "arXiv:1603.02199".

The article describes a learning-based approach to hand-eye coordination for robotic grasping from monocular images. To learn hand-eye coordination for grasping, the researchers trained a large convolutional neural network to predict the probability that task-space motion of the gripper will result in successful grasps, using only monocular camera images and independently of camera calibration or the current robot pose. This requires the network to observe the spatial relationship between the gripper and objects in the scene, thus learning hand-eye coordination. The researchers then use this network to servo the gripper in real time to achieve successful grasps. To train their network, the researchers collected over 800,000 grasp attempts over the course of two months, using between 6 and 14 robotic manipulators at any given time, with differences in camera placement and hardware. Their experimental evaluation demonstrates that their method achieves effective real-time control, can successfully grasp novel objects, and corrects mistakes by continuous serving.

In the research paper the significance of feedback is demonstrated by using continuous visual feedback. Thus, it is obvious that further developed feedback arrangements are needed. Furthermore, different applications may benefit from different types of arrangements.

WO9111885 discloses an automated assembly and packaging system, wherein an apparatus and method for picking up and manipulating randomly oriented and randomly positioned objects moving on an object belt and transferring them to randomly oriented and randomly positioned destinations moving on a destination belt. An image processing unit using a vision system identifies and locates objects and destinations in successive overlapping vision windows up to a predetermined optimum number of objects. The locations of those objects and destinations are entered in an output queue which is transmitted to the object and destination location queues of a first robot motion controller. The first robot picks up and deposits to destinations all the objects it can in the time available while the objects and destinations pass, and enters the locations of the objects not picked up and destinations to which no object is placed in an output queue which is transmitted to the object and destination location queues of a second robot motion controller.

In the above prior art documents principles of robot systems for picking random systems are explained. Furthermore, these documents explain how feedback information may be used in such systems. These principles are assumed to be known by a person skilled in the art and are not explained in more detail.

SUMMARY

A feedback arrangement in a robot system is disclosed. Feedback information is an important aspect in all machine learning systems. In robot systems that are picking objects from a plurality of objects this has been arranged by acquiring images of objects that have been picked. When images are acquired after picking they can be imaged accurately and the information about picking and also dropping success can be improved by using acquired images as a feedback in the machine learning arrangement being used for controlling the picking and dropping of objects.

In an embodiment a method for separating at least one object from a plurality of objects is disclosed. The method comprises determining, by control unit, instructions to manipulate an object in a process area and instructing a robot system comprising a manipulation element to manipulate the object in the process area. The instructions further comprise information necessary to determine a removal location. The method further comprises receiving at least one image of the at least one manipulated object, wherein the image is acquired after the at least one manipulated object has been removed from the process area and using the received at least one image as a feedback of the success of the manipulation and the removal at the control unit.

In an embodiment the method further comprises detecting an object in an imaging area. In another embodiment the method further comprises instructing an imaging unit to acquire an image of the object as a response to the detecting.

In a further embodiment the method further comprises analyzing process area for detecting an object to be manipulated. In another embodiment the method further comprises determining the instructions based on properties of the detected object.

In a further embodiment the method described above is implemented as a computer program. In another embodiment an apparatus is disclosed. The apparatus comprises at least one processor configured to execute computer programs and at least one memory configured to store computer programs and data for computer programs. The apparatus is further connectable to external apparatuses. The apparatus is further configured to perform a method described above.

In another embodiment a system is disclosed. The system comprises at least one robot configured to manipulate objects in a process area and move the objects to a removal area. The system further comprises at least one imaging unit configured to acquire images of the objects and an apparatus as described above. In an embodiment the imaging apparatus is located at the removal area. In another embodiment the removal area is connected to a further conveyor and the imaging apparatus is configured acquire images of objects on the conveyor. In a further embodiment the imaging apparatus is configured to transmit acquired images to the apparatus.

The benefits of described embodiments include improvement of overall performance of a system involving picking correct objects from a process area and moving them to the correct removal area.

A further benefit of the described embodiments is that it is easy to add to existing robot systems and does not require changing the robot but the required imaging unit may be installed separately so that it can acquire images of picked objects and see if they are moved to the correct r area. A further benefit of the described embodiments is that imaging unit and robot system do not need to be calibrated. It is sufficient that the system can keep track that the acquired images are associated with correct pick and drop procedures. However, this does not require any particular calibration

BRIEF DESCRIPTION OF THE DRAWINGS

The accompanying drawings, which are included to provide a further understanding of the feedback arrangement in a robot system and constitute a part of this specification, illustrate embodiments and together with the description help to explain the principles of the feedback arrangement in a robot system. In the drawings.

DETAILED DESCRIPTION

Figure 1:
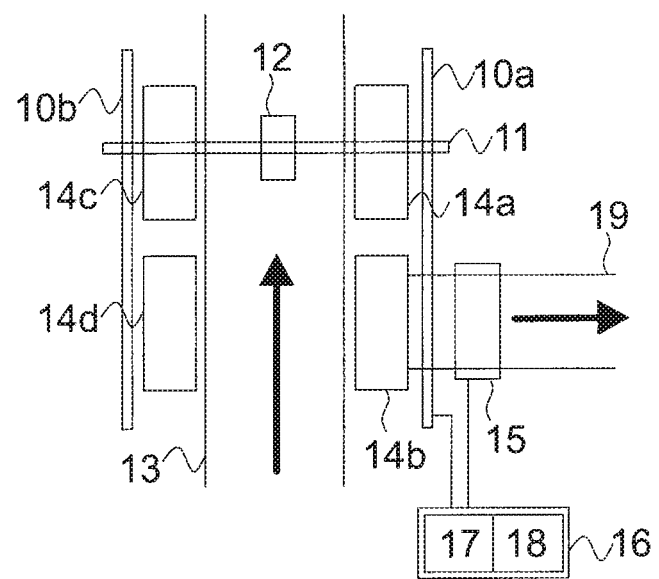
FIG. 1 is a block diagram of an example embodiment of the present feedback arrangement in a robot system.

Reference will now be made in detail to the embodiments, examples of which are illustrated in the accompanying drawings.

In the description following expressions are used in different embodiments. A robot in this context is a robot comprising grasping part, or a gripper, that is capable of picking objects from a predetermined process area and to transport them to a predetermined removal area. This requirement can be fulfilled with several different types of robots, such as so-called arm robots or linear robots. The feedback arrangement disclosed in the following description is suitable for all robot types.

Manipulation in the following description means the act the robot performs to manipulate object(s) in the process area. Typically the robot is equipped with a tool or a gripper with which it manipulates the objects. Manipulation instruction in the following description means any parameters required for the manipulation of object(s) by the robot. For example, the manipulation could be gripping an object with a fingered gripper, in which case the manipulation instructions could, for example, consist of gripper opening width and the coordinates in 3d space to place the gripper to before closing the gripper, and the speed and direction to throw the object to after gripping. The manipulation could alternatively be, for example, moving objects by pushing them, or gripping them with a vacuum suction gripper, or hoovering objects with a robot-moved suction pipe.

Process area in the following description means the area from which one robot is capable of picking objects. The process area is typically limited by the reachability of the robot, however, it may also be limited by walls or other obstacles. The process area in this description should be understood to be a process area for one robot. The system described may have a plurality of process areas as it is obvious that a capacity of a robotic system as in the embodiments may be increased by adding more than one robot to perform the task. The process area may be, for example, an area where a robot is operable and where a conveyor is passing through the process area. Thus, objects to be picked will be brought to the process area by a conveyor and the objects not picked will proceed further to the process area of a next robot or to a container in the end of the conveyor.

In the following description an embodiment having two drop areas as removal areas will be discussed, however, this should not be understood as a limitation. The number of drop areas is chosen on application basis and it is possible to use more than one drop area. If the process area includes a conveyor drop areas may be located on both sides of the conveyor. The robotic system picks up an object from a process area, moves it to the drop area and drops it.

A drop area may be a shaft, chute or similar that is used to move the picked objects to a transportation container or further treatment. From chutes dropped object may be dropped directly to a further conveyor bringing the objects to a container or storage location or there may be container or storage location directly under the chute.

In the following description picking means that the intention of the robot is to move the picked object from a pickup area to a removal area. However, this should be understood broadly. For example, the object can be removed by using various means for lifting as explained above with regard manipulation. It is not always necessary to lift the object but it can also be pulled or pushed to a removal or drop area.

In the following detailed embodiments of a feedback arrangement will be disclosed. The feedback arrangements are different embodiments of an arrangement using images of picked objects acquired by an imaging unit as a feedback for machine learning. The feedback information is used to teach the system to improve the picking action and picking results.

FIG. 1 is a block diagram of a system using the disclosed feedback arrangement in a robot system. The example of FIG. 1 is depicted from above. In the example of FIG. 1 a typical application of waste separation is illustrated. The waste may be construction waste or similar waste that can be picked with a robot.

In FIG. 1 linear robot operating on rails 10a and 10b is disclosed. On the rails, a movable rail 11 is arranged. The rail 11 further comprises a grasping element 12. The grasping element 12 is movable on rail 11. Thus, the grasping element can be moved to a desired location above a conveyor 13 which is running below the level of rails 10 and 11. The distance between the level of rails and conveyor is determined by the size of objects. The waste arriving at pick area below is imaged using a camera and picked in conventional manner using the grasping element 12. The camera may be arranged to the grasping element 12 or to a fixed location so that it can be connected to controller unit 16 by fixed or wireless connection.

Controller 16 comprises at least one processor 17 and at least one memory. The at least one processor 17 is configured to execute computer programs that are configured to control the robot arrangement 10-12 so that the grasping element is first moved to a correct position and then the grasping action is performed. After that the controller is configured to detect the object that was picked and decide which drop area it belongs to. Then the object is dropped in the correct drop area. The at least one memory 18 is configured to store the computer programs executed by the at least one processor 16 and also data related to the computer programs being executed.

In FIG. 1, four drop areas 14a-14d are illustrated. Drop areas may be all similar or different type depending on the application. For example, different types of drop areas may be used when the waste to be treated comprises different types of fractions that are typically different in weight or size. Furthermore, the drop area as whole may be different because of space usage requirement.

In the following drop area 14b is discussed in more detail. Other drop areas 14a, 14c and 14d may be different and other examples are briefly discussed after drop area 14b has been explained. Drop area 14b is a chute through which objects picked by the grasping element 12 are provided to a further conveyor 19. The conveyor 19 transports picked objects to a storage location or similar. Above the conveyor 19 an imaging unit 15 is provided.

The imaging unit 15 comprises at least one camera device for acquiring images of picked and dropped images. Because of the conveyor 19 arrangement it is possible to move objects in a manner that only one picked and dropped object is imaged at time because before the next object is dropped the previous object has already travelled further on the conveyor 19. The image acquired by imaging unit 15 is sent to the controller 16 that uses the received image as a feedback for training the learning system used for generating the picking instructions.

Controller 16 is using an arrangement with machine learning that may be any known machine learning arrangement. For example, commonly known methods that may be used for machine learning, alone or in combinations, include naive Bayes classifiers, Bayesian networks, decision trees, random forests, gradient boosted regression trees, artificial neural networks, fuzzy logic models, probabilistic classification models.

A machine learning arrangement can, for example, be a machine learning method that is trained to classify candidate manipulation instructions into predetermined classes, for example likely successful or likely failing, or to output a probability that the manipulation will result in each of a set of outcomes, and the controller 16 can then use the machine learning arrangement to choose from a set of candidate manipulation instructions the instructions that are most likely to end in a desired outcome. Such candidate manipulation instructions can be generated for example by generating randomized instructions, or using a simpler controller arranged to output compatible manipulation instructions. Alternatively the machine learning arrangement can output the manipulation instructions directly as its output, for example outputting a set of coordinates for placing a gripper to. Using and training the machine learning arrangement may include calculating features associated with the manipulation instructions and the environment and using the calculated features as at least part of the input to the machine learning arrangement. For example, such features can include camera image or 3d camera image data, processed in a suitable way such as for example aligned with the robot gripper, downscaled or otherwise processed to make it suitable for the chosen machine learning arrangement, or object recognition results produced by a machine learning arrangement arranged to recognize objects or materials in an input image.

In the above, an arrangement wherein an object was imaged on a second conveyor located after a chute arranged to a drop area. This was only an example implementation of a feedback arrangement. The feedback can be acquired also other ways.

Figure 4:
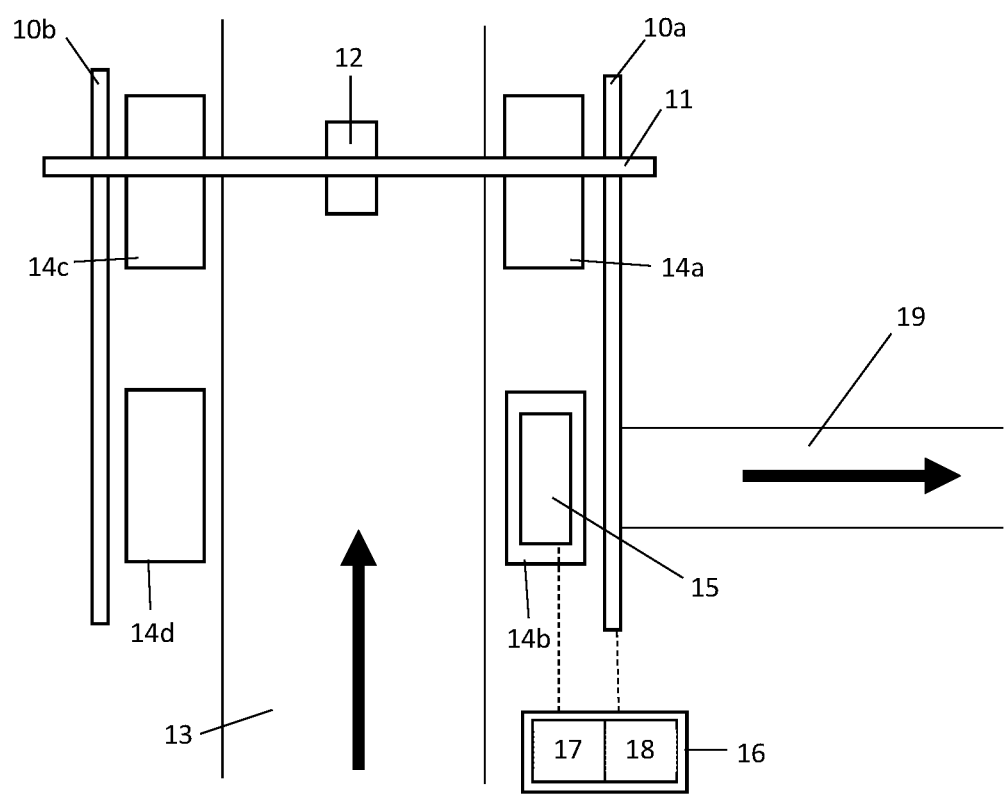
FIG. 4 is a block diagram of an example embodiment of the present feedback arrangement in a robot system.

For example, in an embodiment the robot is configured to bring the object to be dropped to an imaging zone before releasing the grip and dropping the object to a drop area, as shown in FIG. 4. In the imaging zone, a camera is configured to acquire an image to be used as a feedback. In another embodiment the imaging zone is an area, such as a pit to which an object is dropped. After drop an image of the object is acquired. After the image is acquired the object may be, for example, pushed further to a chute or a conveyor.

In each of the above arrangements an image of an object is acquired after the pick has been performed and the drop area has been determined, as shown in FIG. 4. Thus, from the feedback information not only the success of pick but also the success of determining correct drop area is determined. This corresponds with determining the waste fraction to which the picked object belongs to. From the feedback information the distribution of the manipulation result can also be determined, for example that the manipulation resulted in 2 objects of the correct fraction but also 1 object of a wrong fraction ending in the drop area. Such manipulation may be, depending on the application of the whole system, considered a successful or a failed manipulation, however the feedback can in any case then be used in the controller 16.

In the above an image of a manipulated object is acquired. It is also possible that the acquired image does not comprise the object or no image is acquired. This can happen, for example, when the object fell from the robot during the picking action and never reached the drop area.

In the example described above a plurality of fractions were separated using several drop areas, however, the arrangement may be used also for separating one fraction from a flow of waste and the rest of the waste is treated separately in a next phase. In such example only one drop area is needed. The feedback information is used for determining if the pick was successful and if the object picked actually belongs to the drop area.

Figure 2:
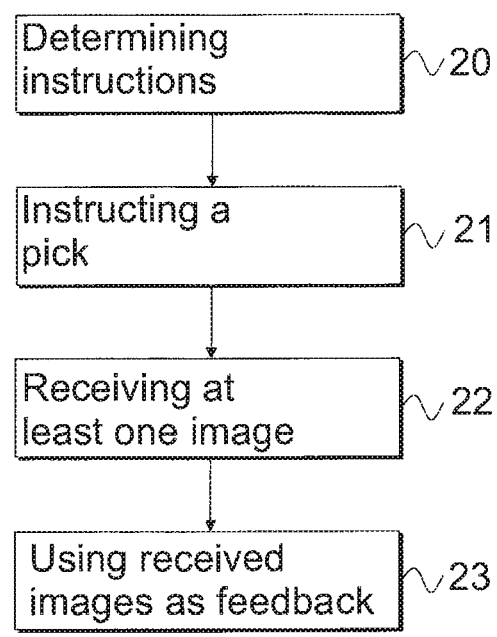
FIG. 2 is a flow chart of an example method according to an embodiment of the present feedback arrangement in a robot system.

In FIG. 2 a flow chart of a method according to the feedback arrangement is described. The following method is suitable to be used with an arrangement as described in FIG. 1, however, it is only an example. The method may be used also in other arrangements that fulfill the requirements of having robotic grasping element controlled by a controller, controlling unit, server or similar, and further having an imaging unit, such as a camera, a plurality of cameras, depth camera, spectral-, infrared-, NIR-, XRF or X-ray imaging unit, imaging metal detector, or any similar imaging unit for providing feedback. The method of FIG. 2 is implemented in a controller controlling the whole system.

The method is initiated by determining instructions for a pick, step 20. The pick area may be stationary or moving conveyor as explained above. The pick area comprises different types of objects that are detected by a camera arrangement. The camera arrangement acquires images and from images it is determined which object should be picked next. The decision may be done based on various variables. For example, when more than one robot is arrangement in series the picking capabilities of following robots may be taken into account because the following robots may have different properties or their drop areas are allocated to different types of objects.

Determined instructions include at least information on what object to pick. This may be done, for example, by instructing the picking coordinates. Picking coordinates may be changing over a time because of the movement of the conveyor and this needs to be taken into account. Instructions may also include information of the desired drop area or areas. When there are more than one suitable drop area it is possible to determine the drop area so that the following movements of the robot system are optimized.

Instructions are then transmitted to the robot, step 21. The instructions may be sent by the controller controlling the whole system directly to the robot making the grasp or there may be further control units in between the controller controlling the whole system and the robot.

The robot then receives the instructions from a controller and moves accordingly to a correct position. When the position has been reached the grasping action is performed and the target object defined by the instructions is picked. The picked object is then brought to the vicinity of drop area and released so that it will drop to the drop area.

After the object has been picked it needs to be imaged. This can be done already before the object is released, for example, when the robot is near the releasing position, as shown in FIG. 4. Other options include the released object is detected when falling to the drop area and image in the air or after it has landed to the drop area.

In the embodiment to which method 2 is suitable the presence of the object is detected automatically and independently from the controller where the method of FIG. 2 is performed. For example, a motion sensor or other detectors may be used to detect the object. When an object is detected then an image is acquired and it is transmitted to the controller.

The controller receives at least one image, step 22 and processes it as a feedback information to be used in machine learning process at the controller, step 23.

Figure 3:
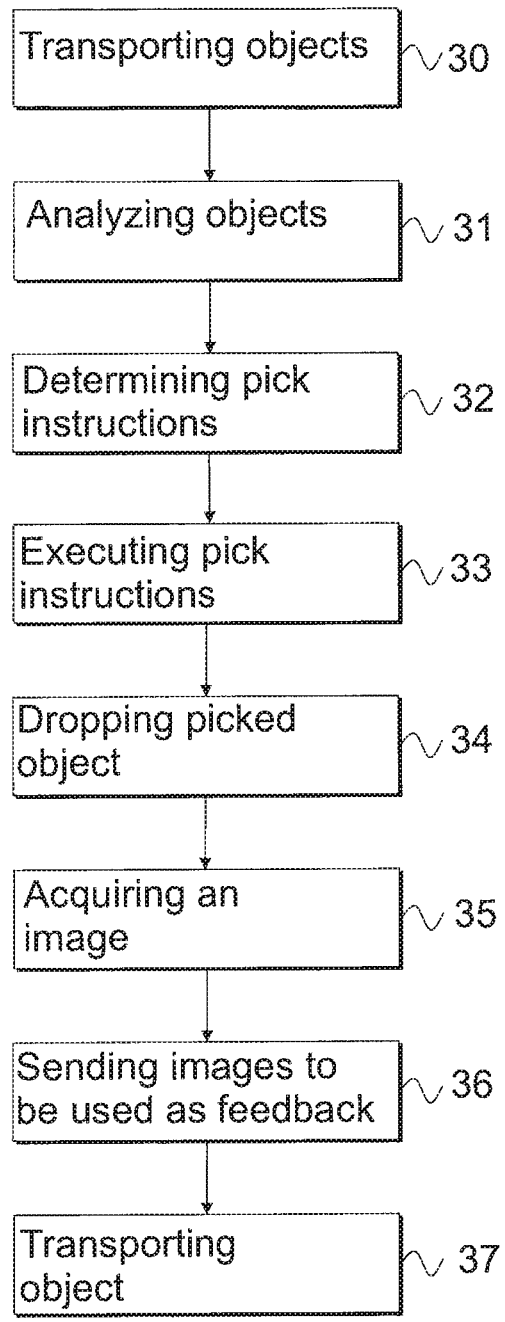
FIG. 3 is a flow chart of an example method according to an embodiment of the present feedback arrangement in a robot system.

In FIG. 3 a method describing functionality of an overall system is described. In the method objects, such as waste to be separated or sorted, is transported to the process area by conveyor or container, step 30. The objects are continuously analyzed in order to detect different object types and quantities, step 31. Based on the analysis results instructions for a pick are determined, step 32.

The pick instructions are executed by a robot with grasping element, step 33. The robot picks up the desired object and drops it to the correct drop area, step 34. When the object has been dropped an image is acquired of the object, step 35. The acquired image is then sent to a machine learning entity that is responsible for analyzing objects and determining pick instructions, step 36. Lastly the dropped object is sent to a storage location, step 37. For example, for waiting transportation to the next location or to be transported directly to a waste processing system located in the vicinity.

The above mentioned method may be implemented as computer software which is executed in a computing device able to communicate with other devices. When the software is executed in a computing device it is configured to perform the above described inventive method. The software is embodied on a computer readable medium so that it can be provided to the computing device, such as the controller 16 of FIG. 1.

FIG. 4 is an embodiment of a block diagram of a system using a disclosed feedback arrangement in a robot system having similar components sharing like reference numerals shown in FIG. 1. FIG. 4 further illustrates an embodiment wherein the robot is configured to bring the object to be dropped to an imaging zone before releasing the grip of the grasping element 12 and dropping the object to a drop area 14a-14c. The imaging unit 15 is configured to acquire an image to be used as a feedback. In such embodiment, an image of the object is acquired after the pick has been performed and the drop area is determined before the object is released in the drop area.

As stated above, the components of the exemplary embodiments can include computer readable medium or memories for holding instructions programmed according to the teachings of the present embodiments and for holding data structures, tables, records, and/or other data described herein. Computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, a carrier wave or any other suitable medium from which a computer can read.

It is obvious to a person skilled in the art that with the advancement of technology, the basic idea of the feedback arrangement in a robot system may be implemented in various ways. The feedback arrangement in a robot system and its embodiments are thus not limited to the examples described above; instead they may vary within the scope of the claims.

The invention claimed is:

1. A method for separating at least one object from a plurality of objects belonging to different types of fractions, the method comprising:
   determining, instructions to manipulate an object in a process area that includes a conveyor;
   instructing a robot system comprising a manipulator to manipulate said object in said process area;

wherein said instructions further comprise information required to determine a drop area for moving said object for further treatment and the method further comprises:
receiving at least one image of said object, wherein said at least one image is acquired 1) after said object has been removed from said process area, 2) after said object has been transported to the drop area and 3) before said object has been released by the manipulator; and
using said received at least one image as a feedback of the success of the manipulation and the removal in a machine learning process executed by a controller;
wherein the drop area comprises a chute that facilitates movement of said object to a further conveyor,
wherein the method is performed under control of the controller.

2. The method according to claim 1, wherein the method further comprises detecting the object in an imaging area.

3. The method according to claim 2, wherein in response to said detecting instructing an imager to acquire the at least one image of said object.

4. The method according to claim 1, wherein the method further comprises analyzing the process area for detecting the object to be manipulated.

5. The method according claim 4, wherein the method further comprises, in response to detecting the object to be manipulated, determining said instructions based on properties of said object.

6. A non-transitory storage medium storing a computer program for separating at least one object from a plurality of objects belonging to different types of fractions, wherein said computer program, when executed by a controller, causes the controller to:
determine instructions to manipulate an object in a process area that includes a conveyor;
instruct a robot system comprising a manipulator to manipulate said object in said process area;
wherein said instructions further comprise information required to determine a drop area for moving said object for further treatment and the controller is further caused to:
receive at least one image of said object, wherein said at least one image is acquired after said object has been removed from said process area, after said object has been transported to the drop area, and before said object has been released by the manipulator; and
use said received at least one image as a feedback of the success of the manipulation and the removal in a machine learning process executed by the controller;
wherein the drop area comprises a chute that facilitates movement of said object to a further conveyor.

7. The storage medium according to claim 6, wherein the controller is further caused to detect the object in an imaging area.

8. The method according to claim 1, further comprising receiving another image of said object in the process area prior to receiving the at least one image, wherein the instructions to manipulate the object in the process area are based on the another image.

9. The method according to claim 1, further comprising receiving another image of said object in the drop area after receiving the at least one image, wherein the another image is captured after said object has been released by the manipulator.

10. The storage medium according to claim 6, wherein the controller is further caused to, in response to said detecting, instruct an imager to acquire the at least one image of said object.

11. The storage medium according to claim 6, wherein the controller is further caused to analyze the process area for detecting the object to be manipulated.

12. The storage medium according to claim 11, wherein the controller is further caused to, in response to detecting the object to be manipulated, determine said instructions based on properties of said object.

13. A system for separating at least one object from a plurality of objects belonging to different types of fractions comprising:
at least one robot configured to manipulate with a manipulator a plurality of objects in a process area that includes a conveyor and move said plurality of objects to a drop area for moving said plurality of objects for further treatment;
at least one imager configured to acquire images of said objects; and
an apparatus comprising a controller configured to determine instructions to manipulate an object of the plurality of objects in the process area and instruct the at least one robot to manipulate said object in the process area;
wherein said instructions further comprise information required to determine the drop area and the controller is further configured to:
receive at least one image of said object, wherein said at least one image is acquired after said object has been removed from said process area, after said object has been transported to the drop area, and before said object has been released by the manipulator; and
use said received at least one image as a feedback of the success of the manipulation and the removal in a machine learning process executed by the controller;
wherein the drop area comprises a chute that facilitates movement of said object to a further conveyor.

14. The system according to claim 13, wherein said imager is located at said drop area.

15. The system according to claim 13, wherein said drop area is connected to the further conveyor and said imager is configured to acquire images of objects on said conveyor.

16. The system according to claim 13, wherein said imager is configured to transmit acquired images to said apparatus.

17. The system according to claim 13, wherein the controller is further configured to detect the object in an imaging area.

18. The system according to claim 13, wherein the controller is further configured to, in response to said detecting, instruct the imager to acquire the at least one image of said object.

19. The system according to claim 13, wherein the controller is further configured to analyze the process area for detecting the object.

20. The system according to claim 19, wherein the controller is further configured to, in response to detecting the object, determine said instructions based on properties of said object.

* * * * *

UNITED STATES PATENT AND TRADEMARK OFFICE
CERTIFICATE OF CORRECTION

| | |
|---|---|
| PATENT NO. | : 11,682,097 B2 |
| APPLICATION NO. | : 17/086671 |
| DATED | : June 20, 2023 |
| INVENTOR(S) | : Tuomas Lukka and Janne Kujala |

It is certified that error appears in the above-identified patent and that said Letters Patent is hereby corrected as shown below:

In the Specification

In Column 2, Line 12, delete "serving.," and insert -- servoing. --.

In Column 6, Line 33, delete "embodiment" and insert -- embodiment, --.

In the Claims

In Column 8, Line 64, in Claim 1, delete "determining," and insert -- determining --.

In Column 9, Line 8, in Claim 1, delete "area" and insert -- area, --.

In Column 9, Line 21, in Claim 3, after "detecting" insert -- , --.

In Column 9, Line 26, in Claim 5, after "according" insert -- to --.

Signed and Sealed this
Fifth Day of September, 2023

Katherine Kelly Vidal
*Director of the United States Patent and Trademark Office*